(No Model.)
W. G. LOOSER.
THERMOSCOPE.
No. 577,439.
Patented Feb. 23, 1897.
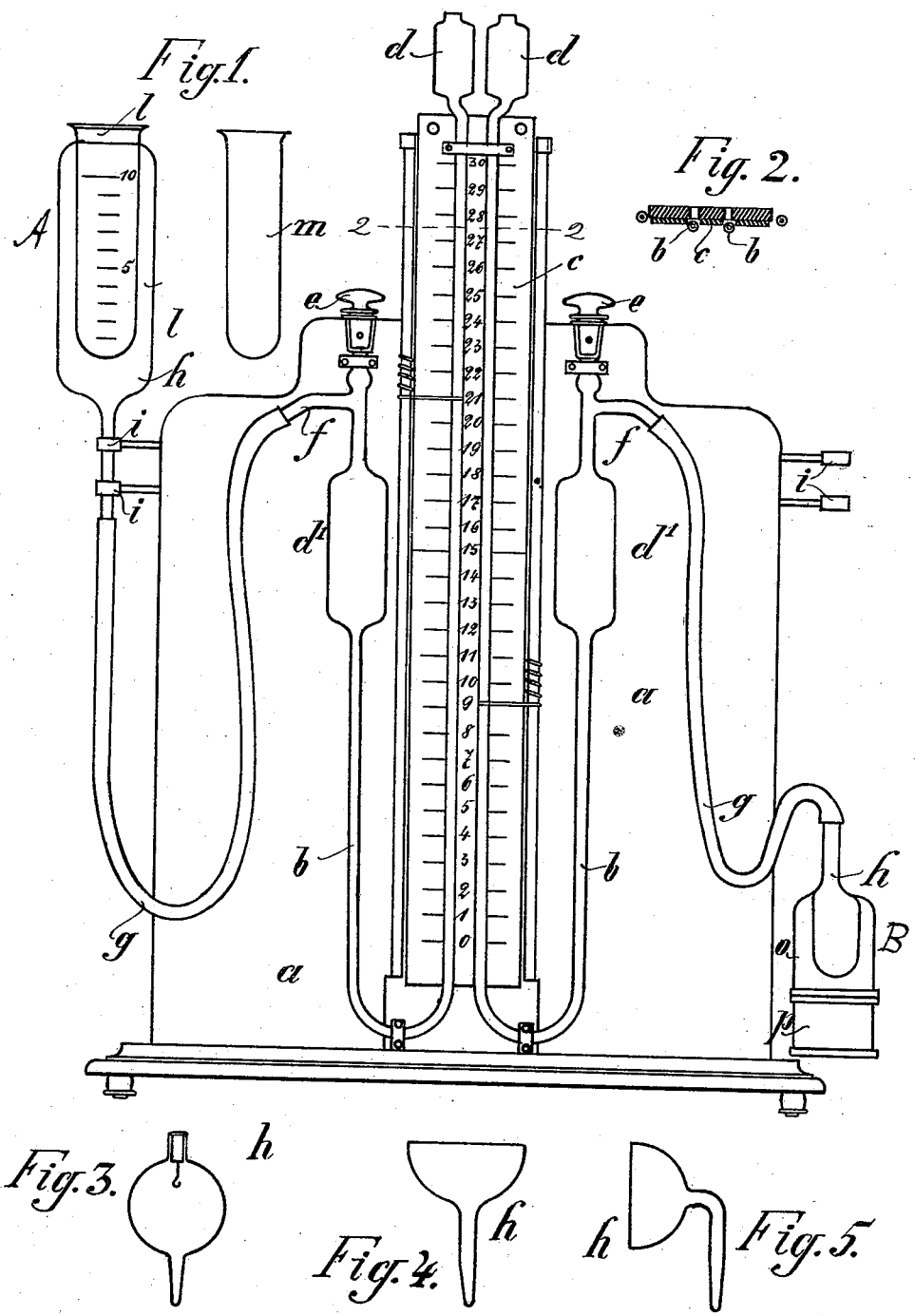

UNITED STATES PATENT OFFICE.

WILHELM GUSTAV LOOSER, OF ESSEN, GERMANY.

THERMOSCOPE.

SPECIFICATION forming part of Letters Patent No. 577,439, dated February 23, 1897.

Application filed August 3, 1895. Serial No. 558,173. (No model.)

*To all whom it may concern:*

Be it known that I, WILHELM GUSTAV LOOSER, professor, of 33 Schillerstrasse, Essen, in the Kingdom of Prussia, German Empire, have invented new and useful Improvements in Thermoscopes, of which the following is a specification.

This invention relates to a double thermoscope whereby simultaneous or parallel experiments on the temperature of gases, liquids, &c., may be effected in a highly-sensitive manner.

The apparatus consists of two single equal thermoscopes, which are based on the principle of an air-thermometer.

The essential feature in the arrangement is the application of a removable air-capsule, which is connected with a graduated U-shaped tube by means of an india-rubber tube.

The mercury-thermometers usually employed for experimental purposes have the disadvantage that the reflection of the mercury renders the reading from a certain distance difficult. The air-thermometers hitherto used are also not very convenient and their use is limited.

In carrying out my invention I make use of a removable air-capsule of such construction that instead of dipping the capsule in the liquids, gases, &c., under experiment the liquids, gases, &c., are placed into the capsule.

In the accompanying drawings, Figure 1 represents a complete double thermoscope. Fig. 2 shows a cross-section through line 2 2 of Fig. 1; and Figs. 3, 4, and 5 illustrate various shapes of air-capsules which are used for special purposes.

The instrument consists of two U-shaped tubes $b$ and $b$, fixed near each other on a frame $a$. Said tubes $b$ and $b$ contain colored alcohol or the like. Behind the inner stem of the tubes there is a scale of opal or milk glass, to allow the level to be measured. The glass for this scale is divided into three parts, so that the height of the liquid may be ascertained from both sides. At the top of these stems there are provided funnel-shaped openings $d$ and $d$ for pouring in the liquid. The outer stems are widened at $d'$ and $d'$ and provided at the top with glass taps $e$ and $e$, which enables the operator to bring about a communication with the outer air. An india-rubber tube $g$ is attached to each horizontal off-tube $f$. The air-capsule $h$ may be connected with the other end of the india-rubber tube. Two rings $i$ and $i$ or equivalent are provided for the purpose of retaining said air-capsule in position. On the left-hand side of Fig. 1 in the drawings (marked A) the preferable construction of the air-capsule is represented.

In the air-capsule $h$, which at the bottom takes the shape of a tube, is fused a tube $l$, which is closed at the bottom and graduated, so that the exact quantity of liquid under experiment may be measured. The sensitiveness of the instrument is such that it is seldom necessary to pour the liquid direct into $l$. It is sufficient generally to introduce a small insertion-glass $m$, filled with the liquid, so as to facilitate cleaning.

The air-capsule may be replaced by a simple globular one, as shown in Figs. 4 and 5, or by the glass case made in two parts, as shown on the right-hand side of Fig. 1 and marked B. In the latter the air-capsule $h$ is fused to the cylinder $o$, while its opened end is attached to the india-rubber tube $g$. Another receptacle $p$, also of a cylindrical shape, may be fixed under the polished edge of said cylinder $o$.

When in use, the U-shaped tube $b$ is filled with colored alcohol up to the middle of the division, which is marked by a notch that can easily be seen. As soon as the air in the air-capsule expands under the influence of the heat of the liquid under experiment the level of alcohol rises in the inner stem of the U-shaped tube. The enlarged portion $d'$ is to prevent the hydrostatic counter-pressure and also to act as a safeguard against the squirting out of the liquid. The tap $e$ serves to equalize at once the levels in both the stems of the U-shaped tubes.

The double arrangement of the whole thermoscope has for its object to enable the operator to make simultaneously controlled or parallel experiments.

Having now described my invention, what I claim, and desire to secure by Letters Patent, is—

In a double thermoscope for experimental purposes the combination of an air-capsule with a glass tube hermetically sealed to it, and a U-shaped tube with enlarged portions and a tap, the tube being partially filled with an inexpansible fluid; as and for the purpose set forth.

In witness whereof I have hereunto signed my name in the presence of two subscribing witnesses.

WILHELM GUSTAV LOOSER.

Witnesses:
 WM. HAUPT,
 CHAS. KRÜGER.